United States Patent
Kitagawa et al.

[11] Patent Number: 5,421,450
[45] Date of Patent: Jun. 6, 1995

[54] HEAT-RESISTANT, LAMINATED CONVEYER BELT

[75] Inventors: Sumio Kitagawa, Yamato; Masanori Ishibashi, Yokohama; Tomomi Haraguchi, Matsuura; Yoshiro Nogami, Takeo, all of Japan

[73] Assignee: Chukoh Chemical Industries, Ltd., Japan

[21] Appl. No.: 250,813

[22] Filed: May 31, 1994

[51] Int. Cl.$^6$ .............................. B65G 15/34
[52] U.S. Cl. ........................... 198/847; 198/957
[58] Field of Search ............ 198/846, 847, 957

[56] References Cited

U.S. PATENT DOCUMENTS 4,403,632  9/1983  Romanski et al. ............ 198/846 X
4,899,872  2/1990  Hokao ......................... 198/846 X

FOREIGN PATENT DOCUMENTS 2301561  7/19/73  Germany
2386634  11/3/78  France
0218995  4/22/87  Europe
0490661  6/17/92  Europe

*Primary Examiner*—Cheryl L. Gastineau
*Attorney, Agent, or Firm*—Merchant, Gould, Smith, Edell, Welter & Schmidt

[57] ABSTRACT

The present invention provides a heat-resistant, laminated conveyer belt comprising a reinforcing layer obtained by impregnating fluoroplastic into a heat-resistant fiber base cloth, drying and sintering the base cloth and a wear-resistant layer, formed on the reinforcing layer, obtained by impregnating fluoroplastic into a base cloth formed by weaving heat-resistant fiber in the form of a knit weave, drying and sintering the base cloth, and its manufacturing method.

10 Claims, 2 Drawing Sheets

ND CONVEYER
HEAT-RESISTANT, LAMINATED CONVEYER BELT

BACKGROUND OF THE INVENTION

1. Field of the Invention

The present invention relates to a heat-resistant, laminated conveyer belt and more particularly to a heat-resistant, laminated conveyer belt used in conveying all flat materials such as cardboard, resin made tile, and to its manufacturing method.

2. Description of the Related Art

In the past, as a conveyer belt used in conveying flat materials, e.g., paper and cardboard, there has been known a conveyer belt in which two to six belts base materials of the same type are laminated through a PFA fluorocarbon resin film, and the conveyer belt made up of two or more layers of belt base materials has been used according to the strength required for its application.

FIG. 4 shows a conventional conveyer belt. This conveyer belt is formed by sandwiching a PFA fluorocarbon resin film 43 between heat-resistant fiber cloths 41 and 42. The heat-resistant fiber cloths are woven cloths made of glass fiber, carbon fiber, aramid fiber and aromatic allylate fiber, and they are also woven in the form of plain weave, satin weave and twill weave. Moreover, the heat-resistant cloth is impregnated on, at least, one side of the surface with TFE fluorocarbon resin, dried, and sintered, and it follows that this composite possesses exceptional properties, that is, high chemical resistance, heat resistance, anti-stick property, and wear resistance. Furthermore, in some cases, an one-layer belt is used under high tension. However, normally, the conveyer belt, which is made up of two or more layers, is used.

However, when two above-mentioned fluoroplastic composites with the heat-resistant cloths of the same-weave are thermally pressurized, thereby obtaining a two-layer belt, the upper layer (hereinafter called "the wear-resistant layer") cannot follow the expansion and contraction of the lower layer (hereinafter called "the reinforcing layer") because of the difference in the circumferential length between the wear-resistant layer and the reinforcing layer. As a result, a surface separation occurs between the heat-resistant fiber cloths and the impregnated fluoroplastic layer inside the wear-resistant layer by the shearing stress of the surface between the reinforcing layer and the wear-resistant layer and/or the shearing stress of the wear-resistant layer itself. Due to this, there is a problem in that the original properties of fluoroplastic are lost and the lifetime of the belt is shortened.

SUMMARY OF THE INVENTION

An object of the present invention is to provide a heat-resistant, laminated conveyer belt which has the long lifetime without losing the original fluoroplastic properties by comprising a wear-resistant layer with the good flexibility, which is obtained by impregnating fluoroplastic into a base cloth formed by weaving heat-resistant fiber in the form of a knit weave, drying and sintering the base cloth, on a reinforcing layer.

Moreover, other object of the present invention is to provide the method for manufacturing a heat-resistant, laminated conveyer belt, which has the a lifetime without losing the original fluoroplastic property, by comprising the steps of obtaining a reinforcing layer by impregnating fluoroplastic into a heat-resistant fiber base cloth, drying and sintering the base cloth and obtaining a wear-resistant layer formed on the reinforcing layer, by impregnating fluoroplastic into a base cloth formed by weaving heat-resistant fiber in the form of a knit weave, drying and sintering the base cloth.

According to the present invention, there can be obtained a heat-resistant, laminated conveyer belt comprising a reinforcing layer obtained by impregnating fluoroplastic into a heat-resistant fiber base cloth, drying and sintering the base cloth; and a wear resisting layer, formed on the reinforcing layer, obtained by impregnating fluoroplastic into a base cloth formed by weaving heat-resistant fiber in the form of a knit weave, drying and sintering the base cloth.

Also, according to the present invention, there can be obtained a method for manufacturing a heat-resistant, laminated conveyer belt comprising the steps of obtaining an reinforcing layer by impregnating fluoroplastic into a heat-resistant fiber base cloth, drying and sintering the base cloth; and obtaining a wear-resistant layer, formed on the reinforcing layer, by impregnating fluoroplastic into a base cloth formed by weaving heat-resistant fiber in the form of a knit weave, drying and sintering the base cloth.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

In the present invention, as a heat-resistant fiber cloth, there can be used glass fiber, carbon fiber, aramid fiber, aromatic allylate fiber. Particularly, glass fiber or aramid fiber is desirably used.

As fluoroplastic, there can be used polytetrafluoroethylene (PTFE), polytetrafluoroethylene-perfluoroalky vinyl ether copolymer (PFA), tetrafluoroethylene hexafluoropropylne copolymer (FEP) in a single form or a form of mixture of two or more kinds. Also, heat-resistant filler may be mixed into fluoroplastic in order to much improve wear resistance of the wear-resistant layer.

As the weaving method of the woven cloth, there are a plain weave, a satin weave, twill weave, and a knit weave. When the composite materials, which are obtained by impregnating fluoroplastic into the woven cloth of the same weaving method, drying and sintering the woven cloth, are laminated in a two-layer belt shape through a PFA film by thermal pressurization, a surface separation occurs particularly between the heat-resistant fiber cloths and fluoroplastic layer of the wear resistant layer because of the shearing stress caused by a difference in a circumferential length between the reinforcing layer and the wear-resistant layer.

Figure 2:
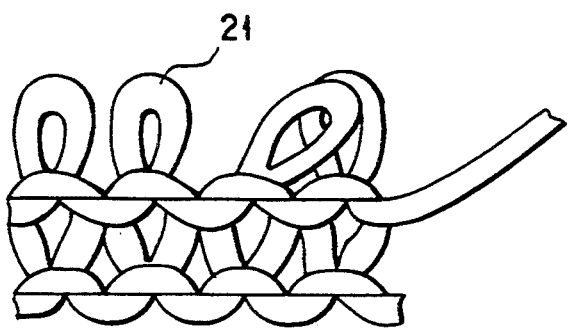
FIG. 2 is a view explaining a knit weave according to the present invention.

Therefore, according to the present invention, in the case of the two-layer belt shape, as compared with the same weaving method, that is, the combinations of the reinforcing layer cloth and the wear-resistant layer cloth such as the plain wave—plain weave, the plain weave—satin weave, and the twill weave—twill weave, the combinations of the reinforcing layer cloth and the wear-resistant layer cloth such as the plain wave—knit weave, the satin weave—knit weave, and the twill weave—knit weave, are preferable. FIG. 2 is a view explaining the knit weave using a knit weaving material 21.

In the present invention, the non-woven fabrious mat, which is made up of heat-resistant, corrugated short fiber or heat-resistant spring-shaped short fiber itself, is also preferably used as the base material of the wear-resistant layer. In that case, the wear-resistant layer is formed in accordance steps: the above mentioned mat is pregnated with fluoroplastic then dried and sintered.

In the present invention, the content of fluoroplastic in the reinforcing layer is 80 weight % or less, preferably 30 to 60 weight %. If the content of fluoroplastic exceeds 80 weight %, there is possibility that the flexibility of the conveyer will be lost. If the content of fluoroplastic is below 30 weight %, there is possibility that bowed filling will occur in the woven cloth. On the other hand, the content of fluoroplastic in the wear-resistant layer is 80 weight % or less, preferably 30 to 60 weight %. If the content of fluoroplastic exceeds 80 weight %, the wear-resistant layer cannot follow the expansion and contraction of the reinforcing layer which the present invention intends. As a result, the ability of expansion and contraction and flexibility will be lost. If the content of fluoroplastic is below 30 weight %, there is possibility that wear of the knit weave itself will be promoted and that the maintenance of the shape of the knit weave itself will be lost.

According to the present invention, the heat-resistant fiber of the wear-resistant layer is formed into a knit weave or a corrugated or spring-shaped non-woven cloth, thereby providing the ability of expansion and contraction for wear-resistant layer. Therefore, flexibility of the wear-resistant layer can be extremely improved as compared with the conventional layer belt, which is manufactured by the same weave structure, so that the lifetime of the belt can be improved.

An embodiment of the present invention will be explained with reference to FIGS. 1A and 1B.

Figure 1A:
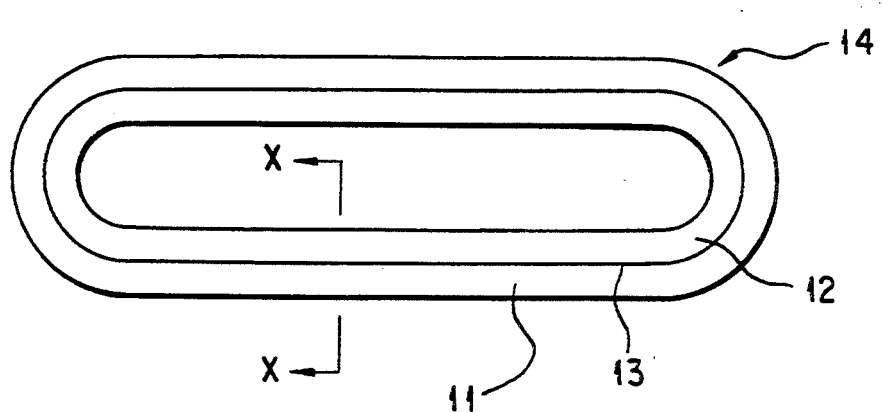
FIG. 1A is a plan view of a heat-resistant, laminated conveyer belt of one embodiment of the present invention.
Figure 1B:
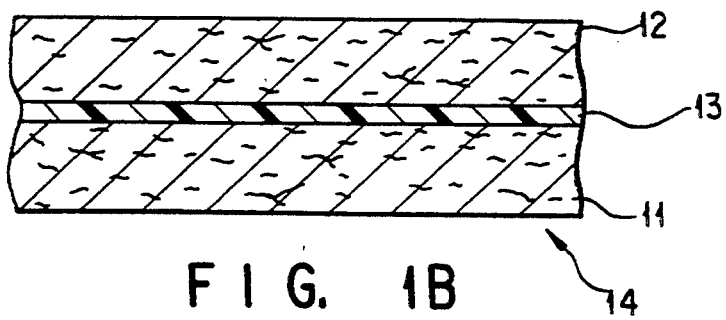
FIG. 1B is a cross sectional view taken along a line of X—X of FIG. 1A.

FIG. 1A is a plan view of a heat-resistant, laminated conveyer belt, and FIG. 1B is a cross sectional view taken along a line of X—X of FIG. 1A.

A reinforcing layer 11 having a thickness of 0.5 mm is formed by impregnating PTFE fluorocarbon resin into a heat-resistant fiber base cloth, and drying and sintering the base cloth. More specifically, the reinforcing layer 11 can be obtained by the following process.

A woven cloth is formed by weaving aromatic aramid fiber (trade name: Technora manufactured by Teijin Co., Ltd.) in the form of the plain weave. PEFE fluorocarbon resin dispersion (trade name: Teflon T-30J, manufactured by Mitsui-Du Pont Fluoro Chemical Co., Ltd) is impregnated into the woven cloth. Then, the woven cloth is dried, and sintered at 380° C. This process is repeated several times, thereby the reinforcing layer 11 can be obtained.

The wear-resistant layer 12 having a thickness of 0.5 mm is formed on the reinforcing layer 11 through a PFA film 13 having a thickness of 25 μm. More specifically, the wear-resistant layer 12 can be obtained by the following process.

A woven cloth is formed by weaving aramid fiber (trade name: Technora manufactured by Teijin Co., Ltd.) in the form of the knit weave. PEFE fluorocarbon resin dispersion (trade name; Teflon T-30J, manufactured by Mitsui-Du Pont Fluoro Chemical Co., Ltd) is impregnated into the woven cloth. Then, the woven cloth is dried, and sintered at 380° C. This process is repeated several times, thereby the wear-resistant layer 12 can be obtained.

The PFA fluorocarbon resin film 13 is sandwiched between the reinforcing layer 11 as a lower layer and the wear-resistant layer 12 as an upper layer. Then, these laminated layers are thermally pressurized at 380° C. under pressure of 0.98 MPa. Then, both ends of the obtained belt-shaped material are butt jointed to each other to be endless.

As mentioned above, a heat-resistant, laminated conveyer belt 14 comprises the reinforcing layer 11, which is obtained by impregnating PTFFE fluorocarbon resin into the aromatic aramid fiber base cloth, drying and sintering the base cloth, and the wear-resistant layer 12, which is formed on the reinforcing layer 11 through the PFA fluorocarbon resin film 13 and which is obtained by impregnating PTFFE into the base cloth, which is formed by weaving aramid fiber in the form of the knit weave, drying and sintering the base cloth to provide the ability of expansion and contraction. Therefore, flexibility of the obtained conveyer belt 14 can be extremely improved as compared with the conventional laminated belt, which is manufactured by the same weave structure, so that the lifetime of the belt can be improved.

Actually, the running test of the conveyer belt 14 of the above-mentioned embodiment was performed in accordance with the following conditions so as to examine the flexibility.

Figure 3:
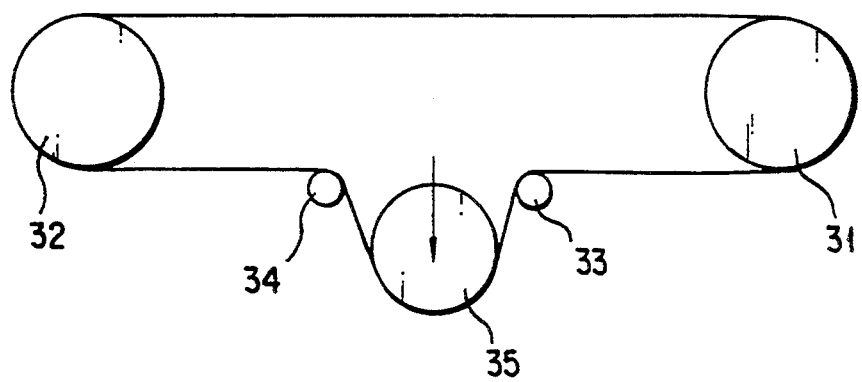
FIG. 3 is a view explaining a running test of the heat-resistant conveyer belt of FIG. 1A.
Figure 4:
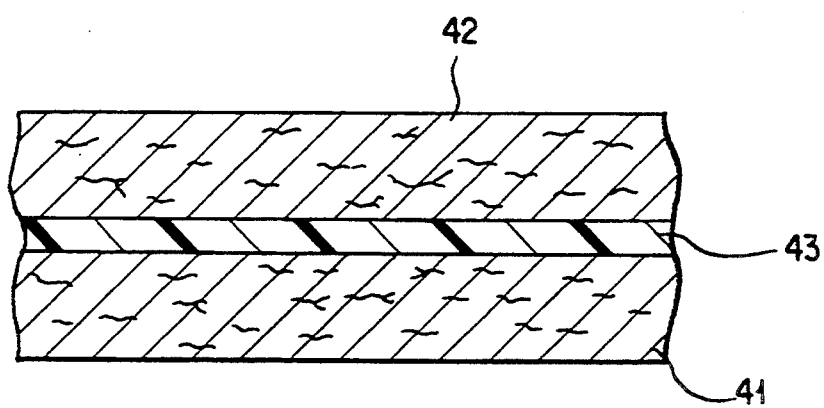
FIG. 4 is a view explaining a conventional layer belt.

The conveyer belt 14 was set as shown in FIG. 3 by use of drive rolls 31 and 32, pulleys 33, 34, and a load pressure roll 35. Then, the conveyer belt 14 was run under conditions of ambient temperature of 180° C., load of 1.5 kN/cm width and belt running speed of 800 m/minutes.

As a result of the running test, the number of times at which the conveyer belt was brokendown was 49,856. On the other hand, regarding the layer belt having the same structure as the above embodiment except the point that the woven cloth of the wear-resistant layer was formed in the form of the plain weave, the above-mentioned number of times was examined. As a result, the number of times was 465. Therefore, it is clear that the present invention is superior to the conventional belt conveyer.

As mentioned above, according to the present invention, there is obtained a belt heat-resistant, laminated conveyer which can has the long lifetime without losing the original fluoroplastic properties on the ground that the wear-resistant layer has the excellent ability of expansion and contraction, that is, the excellent flexibility.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A heat-resistant, laminated conveyer belt comprising:
   a reinforcing layer obtained by impregnating fluoroplastic into a heat-resistant fiber base cloth, drying and sintering the base cloth; and
   a wear-resistant layer, formed on said reinforcing layer, obtained by impregnating fluoroplastic into a base cloth formed by weaving heat-resistant fiber in the form of a knit weave, drying base cloth, drying and sintering the base cloth, thereby provided with the ability of expansion and contraction.

2. A conveyer belt according to claim 1, wherein said heat-resistant fiber is formed out of any one of glass fiber, carbon fiber, aramid fiber, aromatic allylate fiber.

3. A conveyer belt according to claim 1, wherein the heat-resistant fiber of said wear-resistant layer is a non-woven cloth formed out of short fiber having the corrugated shape and the spring-like ability of expansion and contraction.

4. A conveyer belt according to claim 1, wherein the content of fluoroplastic of said reinforcing layer to the total weight of both layers is 80% or less.

5. A conveyer belt according to claim 1, wherein the content of fluoroplastic of said wear resisting layer to the total weight of the layer is 80% or less.

6. A method for manufacturing a heat-resistant, laminated conveyer belt comprising the steps of:
   obtaining a reinforcing layer by impregnating fluoroplastic into a heat-resistant fiber base cloth, drying and sintering the base cloth; and
   obtaining a wear resisting layer, formed on said reinforcing layer, by impregnating fluoroplastic into a base cloth formed by weaving heat-resistant fiber in the form of a knit weave, drying and sintering the base cloth.

7. A method according to claim 6, wherein said heat-resistant fiber is formed out of any one of glass fiber, carbon fiber, aramid fiber, aromatic allylate fiber.

8. A method according to claim 6, wherein the heat-resistant fiber of said wear-resistant layer is a non-woven cloth formed out of short fiber having a corrugated shape and the spring-like ability of expansion and contraction.

9. A method according to claim 6, wherein the content of fluoroplastic of said reinforcing layer to the total weight of the layer is 80 weight % or less.

10. A method according to claim 6, wherein the content of fluoroplastic of said wear-resistant layer to the total weight of the layer is 80 weight % or less.

* * * * *